C. P. O'BRIEN.
RESILIENT WHEEL TIRE.
APPLICATION FILED MAR. 29, 1918.
1,304,801.
Patented May 27, 1919.
2 SHEETS—SHEET 2.
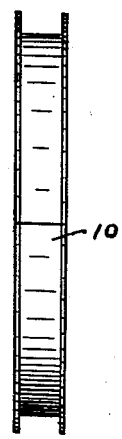
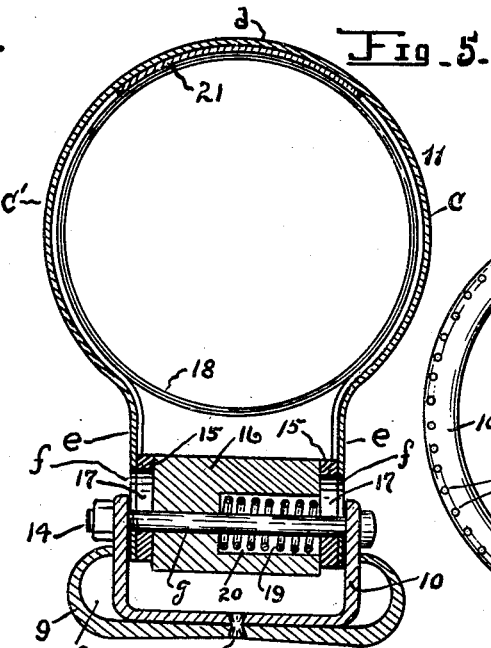
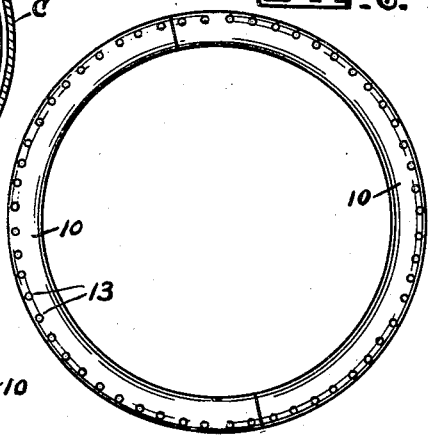
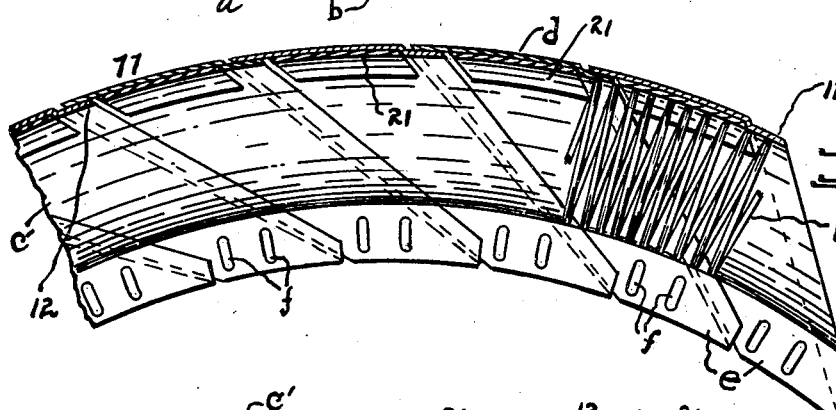
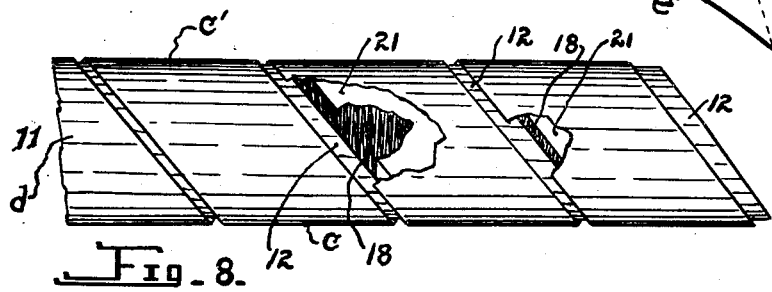
Inventor
Cornelius P. O'Brien,
By Hiram A. Sturges
Attorney

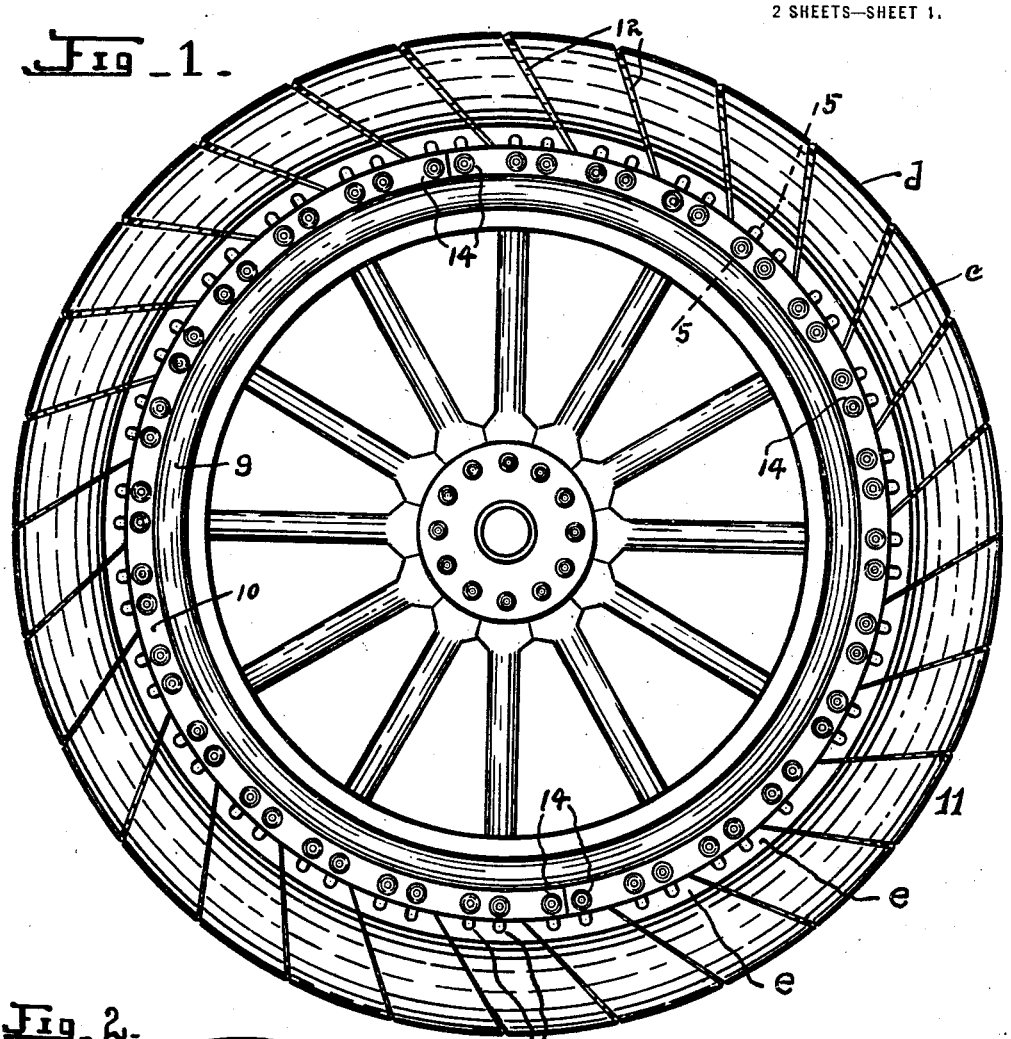
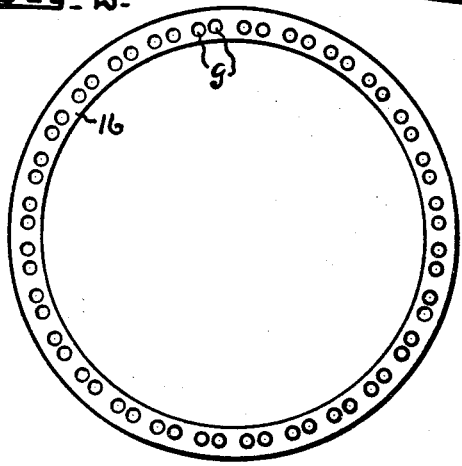

UNITED STATES PATENT OFFICE.

CORNELIUS P. O'BRIEN, OF OMAHA, NEBRASKA.

RESILIENT WHEEL-TIRE.

1,304,801.　　　　Specification of Letters Patent.　　Patented May 27, 1919.

Application filed March 29, 1918. Serial No. 225,400.

*To all whom it may concern:*

Be it known that I, CORNELIUS P. O'BRIEN, a citizen of the United States, residing at Omaha, in the county of Douglas and State of Nebraska, have invented certain new and useful Improvements in Resilient Wheel-Tires, of which the following is a specification.

This invention relates to an improvement in resilient wheel tires, and has for its object to provide a tire which may be conveniently and economically manufactured, will be durable in wear and will have a degree of elasticity similar to rubber tires generally used in connection with motor driven vehicles.

The invention consists of the novel construction, combination and arrangement of parts as described herein and claimed, and as illustrated in the accompanying drawings, wherein,—

Figure 1 is a side view of a vehicle wheel provided with the resilient tire. Fig. 2 is a side view of a spacing-ring or filler. Fig. 3 is a perspective view of a bearing-block. Fig. 4 is an edge view of an annular chair or peripherally grooved rim. Fig. 5 is a transverse sectional view on line 5—5 of Fig. 1, the scale being enlarged. Fig. 6 is a side view of parts shown in Fig. 4. Figs. 7 and 8 are enlarged details to clearly show the curved plates or sections for a part of the casing of the tire, Fig. 7 showing the connected plates in longitudinal section, and Fig. 8 being a plan view of the connected plates.

Referring now to the drawing, the invention is illustrated in connection with a demountable rim 9 of conventional type. I provide an annular chair or peripherally grooved rim 10, preferably being a two-part structure as best shown in Figs. 1 and 6, the parts being seated in the annular channel $a$ of the rim 9 and connected at their abutting ends with a bearing-plate 15 by the adjacently disposed bolts 14; and said member 10 is secured to the rim 9 by any suitable means, as by use of rivets $b$, shown in Fig. 5.

I provide an annular, cylindrical casing 11 consisting of a plurality of elongated, resilient plates curved transversely and longitudinally to provide its sides $c$ and $c'$ and peripheral part $d$, each plate having inwardly projecting parts $e$ disposed in substantially parallel, adjacent planes, to operate as holding-flanges, each flange being provided with a pair of slots $f$.

As thus described, each plate provides a longitudinal part or section of the casing when they are disposed end-to-end. Numeral 12 indicates a depressed end-portion provided for each plate or section, the depth of each depression being equal to the thickness of the plate, and, as plainly shown in the drawing, when the parts are assembled, the depressed part 12 of each plate underlies and is engaged by an end portion of an adjacent plate or section. The plates are so formed or bent that a part of each side $c$, when the plates are assembled, will be disposed diametrically opposite to a part of a side $c'$ of an adjacent plate, so that the slots $f$ in the flanges $e$ of one plate will be disposed opposite to the slots of a flange of two adjacent plates, the flanges $e$ of each plate being disposed comparatively remote from each other at opposite sides and longitudinally of the casing.

The rim 10 is substantially of U-shape in cross-section and it is provided with apertures 13, as best shown in Fig. 6, arranged in pairs for receiving the bolts 14. Each flange $e$ is provided, on its inner side, with a bearing-plate 15, said plate being suitably secured to the flange. Numeral 16 indicates a spacing-ring or filler interposed between the flanges $e$ of the casing-plates, and adapted to slidably engage the bearing-plates 15.

The bearing-plates are provided with slots 17, and, as best shown in Fig. 5, the bolts 14 traverse the apertures $g$ of the spacing-ring and engage in the slots $f$ and slots 17.

At 18 is indicated an endless, spiral spring which is disposed in the cylindrical part of the casing, said spring being of such proportions that it normally tends to press the plates outwardly with considerable force, said outward pressure causing normal engagement of the bolts 14 with the inner ends of the radially disposed slots $f$ and 17, the outward pressure of the spring 18 being resisted by said bolts.

Each bolt 14 is circumscribed by a helical spring 19 which is disposed in a recess 20, these recesses being formed to open on one side of the spacing-ring and the springs 19 tending to press the flanges e against the sides of the rim 10, to prevent vibration, the plates 15 not being pressed against the spacing-ring 16 by bolts 14 with sufficient force to prevent said vibration.

Numerals 21 indicate filler-plates, these being curved transversely and longitudinally conforming to the curvatures of the casing-plates and each being adapted to be disposed upon the concaved side of a peripheral part $d$ of a casing-plate and in engagement therewith, so that the spring 18 may have, approximately, a uniform pressure, said filler-plates being attenuated and having the same thickness as the casing-plates.

By referring to Figs. 7 and 8 it will be seen that the filler-plates 21 have such a length that their ends will not obtrude to prevent a slidable movement of the casing-plates upon the depressed parts or ledges 12, this being, obviously, a desired feature.

During operation, on account of the weight of the load, the lower sections or casing-plates will be disposed closely adjacent to each other, the sections, at the upper part of the wheel, being disposed somewhat farther apart. Each plate or section, therefore is adapted to have a limited swinging movement on its pair of bolts 14, and to have a sliding movement longitudinally, upon a ledge or depressed part 12.

Since the slots $f$ and 17 are disposed radially of the wheel, the tire may move inwardly of the wheel, the bearing-blocks 15 sliding upon the spacing-ring 16, the slots $f$ and 17 in which the bolts 14 engage, permitting this movement of the tire, and this inward movement of the tire will occur during operation when driving over obstructions which cause jolts or excessive vibration, the spring 18 resisting the inward movements of the tire mentioned, and therefore providing the elastic action to prevent undue vibration.

The principal function discharged by the blocks 15 is to prevent wear of the flanges $e$ and to reinforce said flanges, since the latter are preferably constructed of attenuated sheet metal. The blocks 15 may therefore be dispensed with if the casing-plates and their flanges $e$ are constructed of material having adequate thickness. While I have shown a rim 9 for a support, and prefer its use since it bears upon the outer sides of the peripherally grooved rim 10 to sustain transverse stresses, it is obvious that the invention does not depend upon the rim 9.

Among some of the advantages to be derived by use of the invention, it may be stated that in addition to providing a desired resiliency, the casing is durable as compared with conventional casings made of rubber or fibrous, flexible material. Also the spiral spring 18 operates as a substitute for the conventional inflated, inner tire, and since the parts are few and simple they may be conveniently produced.

Having fully described my invention, what I claim and desire to secure by Letters Patent is,—

1. In a resilient wheel tire, the combination of an annular support having a peripheral groove, an apertured spacing-ring provided with recesses and disposed in said groove, metallic plates each having a part curved transversely and longitudinally and having a pair of flanges provided with slots, said plates being disposed in line and slidably connected to provide a cylindrical, annular part outwardly of said support with their flanges engaging in said peripheral groove, a plurality of bearing-plates each being provided with slots and secured to a flange, bolts traversing the slots of said flanges, the slots of the bearing-plates and the apertures of the spacing-ring, resilient means in the recesses of the spacing-ring normally tending to press the bearing-plates transversely of the spacing-ring, and resilient means within the cylindrical, annular part to normally press the plates outwardly from the support, said metallic plates being of such form that the flanges of one plate will engage the flanges of two plates adjacent thereto.

2. In a resilient wheel tire, the combination of an annular rim having a peripheral groove and having apertures formed in the side walls thereof, a plurality of plates of spiral form curved longitudinally and adapted to be disposed in line to form an annular, cylindrical casing outwardly of said rim with the end portion of one plate underlying an end portion of an adjacent plate, each plate having a pair of flanges provided with slots and adapted to be disposed in the groove of said rim, a plurality of bolts, each bolt traversing a slot of a flange of one plate, the slot of a flange of an adjacent plate and an aperture of each side wall of said rim, and an endless, spiral spring in said casing in engagement with said plates.

3. In a resilient wheel tire, the combination of an annular rim having apertures and a peripheral groove, a plurality of plates curved transversely and longitudinally, each having a depressed end-portion, said plates being adapted to be disposed in line to form an annular, cylindrical casing outwardly of said rim, the depressed end-portion of one plate underlying an end-portion of an adjacent plate, each plate having a pair of flanges provided with slots and adapted to be disposed in the groove of said rim, a plurality of bolts each traversing a slot of a flange of one plate at one side of the casing and a slot of a flange of an adjacent plate at the opposite side of the casing, and a spiral spring in said casing in engagement with said plates.

4. In a resilient wheel tire, the combination of an annular support, a plurality of metallic plates substantially of spiral form, each having a part curved longitudinally and having a pair of substantially parallel, terminal flanges inwardly of the longitudinally curved part, said plates being disposed with their curved parts in line and slidably connected to provide a cylindrical, annular part outwardly of said support, each flange of each plate being disposed in engagement with a flange of a plate adjacent thereto, means to maintain the flanges in engagement with said support, and resilient means within the cylindrical, annular part to normally press the plates outwardly from said annular support.

5. In a resilient wheel tire, an annular support of U-shape in cross-section having apertures in its opposed walls, a cylindrical, annular casing consisting of a plurality of metallic plates disposed end to end in engagement, each being curved transversely and longitudinally and provided with a pair of terminal flanges having radially disposed slots and disposed between the opposed walls of the annular support, a plurality of bolts, each of said bolts traversing an aperture in each opposed wall of the annular support and engaging in a radially disposed slot of a flange of one plate and a radially disposed slot of a flange of an adjacent plate, and a resilient member in the casing to normally press said plates outwardly thereof.

6. In a resilient wheel tire, an annular rim having apertures and a peripheral groove, a plurality of plates each being substantially of spiral form with a longitudinal curvature, said plates being adapted to be disposed in line to form an annular, cylindrical casing outwardly of said rim, each plate having a pair of flanges provided with slots and adapted to be disposed in the groove of said rim, the flanges of a plate being in engagement with the flanges of two adjacent plates, bolts traversing the slots of said flanges and the apertures of the rim, and a resilient member in the casing in engagement with said plates.

7. In a resilient wheel tire, an annular rim having apertures and a peripheral groove, a plurality of plates curved transversely and longitudinally each having a depressed end-portion, said plates being adapted to be disposed in line to form an annular, cylindrical casing outwardly of said rim, the depressed end-portion of one plate underlying an end-portion of an adjacent plate, each plate having a pair of flanges provided with slots and adapted to be disposed in the groove of said rim, a plurality of filler-plates each being curved transversely and longitudinally and disposed on the concaved side adjacent to the peripheral part of a first named plate, and an endless, spiral spring in said casing in engagement with said filler-plates and first named plates.

8. In a resilient wheel tire, an apertured rim having a peripheral groove, an annular cylindrical casing outwardly of said rim, said casing consisting of curved metallic plates disposed in line, the end-portion of one plate engaging the inner side of an end-portion of an adjacent plate, said plates having flanges provided with slots, bearing-plates provided with slots and secured to said flanges, a spacing ring provided with apertures and having recesses opening on one of its sides and disposed in the groove of said annular rim, bolts traversing the apertures of the annular rim and the apertures of the spacing-ring and also traversing the slots of said flanges and the slots of the bearing-plates, spiral springs in the recesses of the spacing ring each being in engagement with a bearing-plate, and a spiral spring in said casing to normally cause an outward pressure of said plates.

In testimony whereof, I have affixed my signature in presence of two witnesses.

CORNELIUS P. O'BRIEN.

Witnesses:
HIRAM A. STURGES,
ARTHUR H. STURGES.